US012427679B2

(12) United States Patent
Rohde

(10) Patent No.: US 12,427,679 B2
(45) Date of Patent: Sep. 30, 2025

(54) MULTIPLE BLADE ADJUSTABLE KNIFE

(71) Applicant: Tyson Kyle Kidwell Rohde, Durham, NC (US)

(72) Inventor: Tyson Kyle Kidwell Rohde, Durham, NC (US)

( * ) Notice: Subject to any disclaimer, the term of this patent is extended or adjusted under 35 U.S.C. 154(b) by 334 days.

(21) Appl. No.: 18/303,861

(22) Filed: Apr. 20, 2023

(65) Prior Publication Data

US 2023/0339126 A1 Oct. 26, 2023

Related U.S. Application Data

(60) Provisional application No. 63/334,917, filed on Apr. 26, 2022.

(51) Int. Cl.
*B26B 1/08* (2006.01)
*B26B 3/04* (2006.01)
*B26B 27/00* (2006.01)

(52) U.S. Cl.
CPC .................. *B26B 1/08* (2013.01); *B26B 3/04* (2013.01); *B26B 27/00* (2013.01)

(58) Field of Classification Search
CPC .............. B26B 1/08; B26B 3/04; B26B 27/00
See application file for complete search history.

(56) References Cited

U.S. PATENT DOCUMENTS 1,814,528 A * 7/1931 Purcell ...................... B26B 3/04 30/304
2,396,443 A * 3/1946 Singer ....................... B26B 3/04 30/304
2,448,383 A * 8/1948 Mathaus ................... B26B 3/04 30/304
4,969,267 A * 11/1990 Anenberg ................. B26B 3/04 30/304
D342,000 S * 12/1993 Diotte ............................ D7/693
5,456,010 A * 10/1995 Bryda ....................... B26B 3/04 30/286
5,533,269 A * 7/1996 Pickens .................. A21C 15/04 30/294
5,680,705 A * 10/1997 Josoha .................... B26B 5/008 30/304

(Continued)

FOREIGN PATENT DOCUMENTS

CN 2393694 Y 8/2000
CN 201201248 Y 3/2009

(Continued)

OTHER PUBLICATIONS

Notification of Transmittal of the International Search Report and the Written Opinion of the International Searching Authority, or the Declaration, PCT/US2023/065995, Aug. 18, 2023, 11 pages.

*Primary Examiner* — Sean M Michalski

(74) *Attorney, Agent, or Firm* — Stanek Lemon Crouse & Meeks, PA

(57) ABSTRACT

An adjustable multi-blade knife is disclosed that includes a handle, a plurality of blades, and a blade spacing adjustment mechanism. The blades are oriented in parallel with each other and supported by the handle. The blade spacing adjustment mechanism is operable to cause movement of the second blade relative to the first blade while retaining a substantially parallel orientation with the first blade.

20 Claims, 7 Drawing Sheets

(56) References Cited

U.S. PATENT DOCUMENTS

| | | | | |
|---|---|---|---|---|
| 6,676,181 | B1 * | 1/2004 | Greiner | A47L 13/34 294/7 |
| 6,887,250 | B1 * | 5/2005 | Dority | A61B 17/3213 30/305 |
| 7,255,705 | B2 | 8/2007 | Hsu et al. | |
| 8,065,945 | B2 * | 11/2011 | Kobayashi | A61B 17/32 30/304 |
| D1,005,060 | S * | 11/2023 | Stewart | D7/381 |
| 2009/0144987 | A1 * | 6/2009 | Mills | B26B 3/04 83/13 |
| 2013/0031790 | A1 * | 2/2013 | Lambert | B26B 3/04 30/304 |
| 2021/0084803 | A1 * | 3/2021 | Harmon | A01B 49/02 |
| 2023/0339128 | A1 * | 10/2023 | Kalkstein | B26B 5/008 |

FOREIGN PATENT DOCUMENTS

| | | | |
|---|---|---|---|
| CN | 203031620 | U | 7/2013 |
| JP | 2013255715 | A | 12/2013 |
| KR | 20150000825 | U | 2/2015 |
| KR | 20160059701 | A | 5/2016 |

* cited by examiner

MULTIPLE BLADE ADJUSTABLE KNIFE

RELATED APPLICATIONS

The present application claims priority to and the benefit of U.S. Provisional Application No. 63/334,917, entitled "MULTI-BLADE ADJUSTABLE KNIFE," filed Apr. 26, 2022, which is hereby incorporated herein by reference in its entirety. Any and all applications for which a foreign or domestic priority claim is identified in the Application Data Sheet as filed with the present application are incorporated by reference under 37 CFR 1.57 and made a part of this specification.

FIELD

The present disclosure generally relates to the field of cutting tools, and more specifically to multi-blade knives with adjustable blade spacing.

BACKGROUND

Knives are commonly used in food preparation to perform tasks such as cutting, slicing, or chopping. A traditional knife has a single, fixed blade whose functionality is often based on its length, shape, or sharpness.

SUMMARY

Disclosed herein is an adjustable multi-blade knife that provides a practical and reliable solution for cutting tasks that require different blade spacing and methods of using the same. The knife can include a handle, multiple blades positioned with their cutting edges in a linear arrangement and at least partially supported by the handle, and a blade spacing adjustment mechanism that facilitates movement of one or more blades relative to the others.

Disclosed herein is an adjustable multi-blade knife that includes a handle, a plurality of blades, and a blade spacing adjustment mechanism. The plurality of blades can be oriented in parallel with each other and supported by the handle. Each blade of the plurality of blades can have a cutting edge that is linearly aligned with each other cutting edge. Activation of the blade spacing adjustment mechanism can cause movement of at least one blade of the plurality of blades relative to another blade of the plurality of blades while retaining a substantially parallel orientation between the plurality of blades.

The knife described in any of the preceding paragraphs may incorporate any of the features described in this paragraph, or any other features disclosed herein and/or illustrated in the accompanying drawings. The blade spacing adjustment mechanism can include a push button that, upon being pressed, can cause movement of the at least one blade of the plurality of blades. The blade spacing adjustment mechanism can include a thumb wheel. Rotation of the thumb wheel can activate the blade spacing adjustment mechanism. The plurality of blades can include a first blade and a second blade. The rotation of the blade spacing adjustment mechanism can cause the second blade to move further away from the first blade or move closer to the first blade, while retaining the substantially parallel orientation with the first blade. The plurality of blades further can include a third blade. The rotation of the blade spacing adjustment mechanism can cause the second blade and the third blade to move in opposite directions.

The knife described in any of the preceding paragraphs may incorporate any of the features described in this paragraph, or any other features disclosed herein and/or illustrated in the accompanying drawings. The plurality of blades can include a first blade and a second blade. The blade spacing adjustment mechanism can be in mechanical communication with a support member coupled to at least one blade of the plurality of blades. The activation of the blade spacing adjustment mechanism can cause the support member to translate the support member in a first direction, thereby translating the second blade in the first direction. The first blade can be a full tang blade that extends a full length of the handle. The second blade can be a partial tang blade. The blade spacing adjustment mechanism can include a thumb screw and an elongate screw member extending from the thumb screw. The support member can include a screw interface for interfacing with the elongate screw member. The screw interface of the support member and the elongate screw member of the blade spacing adjustment mechanism can form a screw-and-nut mechanism such that rotation of the thumb screw can cause the elongate screw member to screw into or unscrew from the screw interface. Unscrewing the elongate screw member from the screw interface can increase a distance between the first blade and the second blade, and screwing the elongate screw member into the screw interface can decrease the distance between the first blade and the second blade.

The knife described in any of the preceding paragraphs may incorporate any of the features described in this paragraph, or any other features disclosed herein and/or illustrated in the accompanying drawings. The blade spacing adjustment mechanism can be supported by an aperture in one of the plurality of blades. The blade spacing adjustment mechanism can be accessible by an operator from a top portion of the knife. The blade spacing adjustment mechanism may not be accessible from any other portions of the knife. The knife can include a locking feature. The locking feature can inhibit shifting or movement of the plurality of blades during use of the knife, while allowing manipulation of the plurality of blades via the blade spacing adjustment mechanism.

Disclosed herein is an adjustable multi-blade knife that includes a handle, a first blade extending a length of the handle, a second blade and a third blade, respective support members, and a blade spacing adjustment mechanism. The second blade and the third blade can be positioned on opposite sides of and oriented in parallel with the first blade. Each of the second and third blades can include a tip end and a second end that is opposite a respective tip end. Each of the first, second, and third blades can have a respective cutting edge that is linearly aligned with each other cutting edge. The respective support members can be coupled to the second ends of the second and third blades. Each support member can include a screw interface. The blade spacing adjustment mechanism can include thumb screws positioned on opposite sides of the first blade, screw members extending from the thumb screws to the screw interfaces in the respective support members, an attachment member that couples the thumb screws and extends through an aperture in the second blade. The screw members can be rotatable by manipulating the thumb screws to screw into or unscrew from the screw interfaces. Rotation of the thumb screws in a first direction can cause the screw members to at least partially unscrew from the screw interfaces and the first and third blades to move away from the second blade while retaining a substantially parallel orientation with the first blade. Rotation of the thumb screws in a second direction can cause the screw members to at least partially screw into the screw interfaces and the first and third blades to move towards the second blade while retaining the substantially parallel orientation with the first blade.

The knife described in any of the preceding paragraphs may incorporate any of the features described in this paragraph, or any other features disclosed herein and/or illustrated in the accompanying drawings. Each thumb screw can be configured to rotate independently of all other thumb screws, thereby allowing independent adjustment of a position of the second blade or the third blade. The first blade can be a full tang blade and the second and third blades may not be full tang blades. The blade spacing adjustment mechanism can be accessible by an operator from a top portion of the knife, and the blade spacing adjustment mechanism may not be accessible from any other portions of the knife. The knife can include a locking feature that inhibits shifting or movement of the first, second, and third blades during use of the knife.

Disclosed herein is a method for adjusting spacing between a first blade and a pair of second and third blades in a multi-blade adjustable knife. The method can include providing a multi-blade adjustable knife comprises a first, second, and third blade, and rotating a thumb screw of the knife in a first direction to cause screw members to at least partially unscrew from screw interfaces, thereby moving the second and third blades away from the first blade while retaining a substantially parallel orientation with the first blade. The knife can include a handle, a first blade extending a length of the handle, a second blade and a third blade positioned on opposite sides of and oriented in parallel with the first blade. Each of the second and third blades can include a tip end and a second end that is opposite a respective tip end. Each of the first, second, and third blades can have a respective cutting edge that is linearly aligned with each other cutting edge. The knife can include respective support members coupled to the second ends of the second and third blades. Each support member can include a screw interface. The knife can include a blade spacing adjustment mechanism that can include the thumb screws positioned on opposite sides of the first blade, elongated screw members extending from the thumb screws to the screw interfaces in the respective support members, and an attachment member that couples the thumb screws and extends through an aperture in the second blade.

The method described in the preceding paragraph may incorporate any of the features or steps described in this paragraph, or any other features or steps disclosed herein and/or illustrated in the accompanying drawings. The method can further include rotating the thumb screws in a second direction to cause the screw members to at least partially screw into the screw interfaces, thereby moving the first and third blades towards the second blade while retaining the substantially parallel orientation with the first blade.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Traditional knives often have a single, fixed blade. While these knives may be effective at cutting, they lack the efficiency of multi-blade knives. For example, if an operator wanted to cut a vegetable into thin slices with a traditional single-blade knife, they would need to carefully slice through the vegetable multiple times to achieve the desired thickness. This can be time-consuming and may not result in consistent slices. In contrast, the multi-blade knives can allow for more efficient cutting. However, traditional multi-blade knives include fixed blades that are permanently set in place, limiting their functionality.

To address these or other challenges, a multi-blade adjustable knife is disclosed herein. This knife can include a handle housing, a plurality of blades oriented substantially parallel to each other and supported by the handle housing, and a blade spacing adjustment mechanism in mechanical communication with the one or more of the blades. The blade spacing adjustment mechanism provides the operator with the option to adjust the spacing between the blades, allowing for more efficient and precise cutting of various materials.

The blade spacing adjustment mechanism enhances the knife's flexibility, precision, and performance, making the knife a practical and reliable tool for a variety of cutting applications. This feature allows operators to customize the knife to different cutting tasks. For example, the multi-blade knife can be used to thinly slice meats or vegetables or adjusted to provide a wider spread for chopping or dicing. The blade spacing adjustment mechanism, which may include a thumb screw, can be positioned away from the cutting area, reducing the risk of debris getting trapped and inhibiting the mechanism, making it a practical and hygienic design. The multi-blade adjustable knife allows for more versatility and efficiency in the kitchen, as it provides multiple blades in a single knife that can be easily adjusted to accommodate different cutting needs. The ability to move the blades closer or farther apart and to lock them into place allows for precision and control in cutting, making it easier to achieve consistent results. The design of the knife also reduces the need for multiple knives, saving space and cost in the kitchen.

Figure 1:
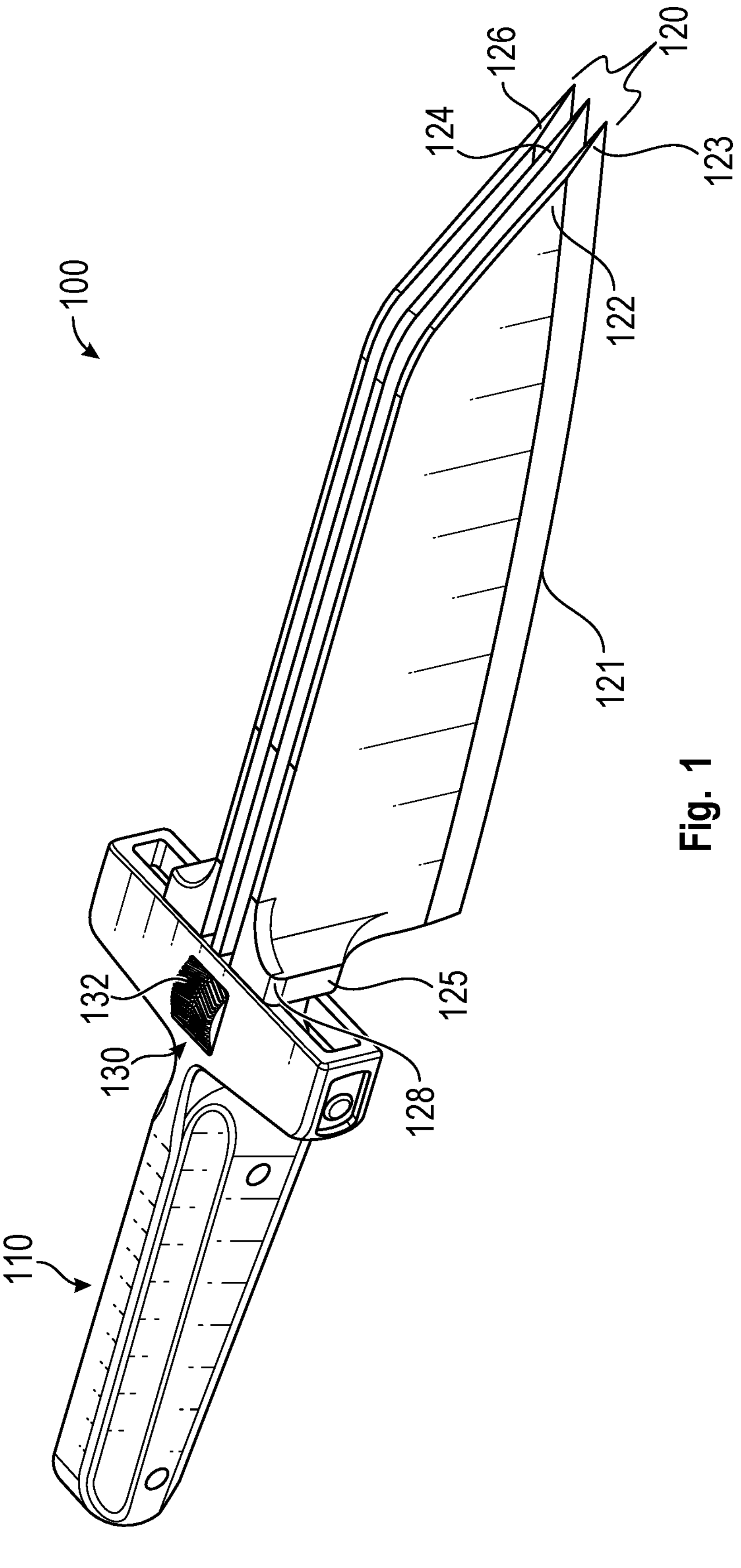
FIG. 1 illustrates a perspective view of an example multi-blade adjustable knife in accordance with various embodiments of the present disclosure.

FIG. 1 illustrates a perspective view of an example multi-blade adjustable knife 100 in accordance with various embodiments of the present disclosure. The knife 100 includes a handle 110, a set 120 of blades, and a blade spacing adjustment mechanism 130. It will be appreciated that the knife 100 may include additional, fewer, or different components across various embodiments.

The set 120 of blades 122, 124, 126 includes a plurality of blades 122, 124, 126 that are oriented substantially parallel to each other, with the cutting edge 121 of each blade 122, 124, 126 linearly aligned across each of the set 120 of blades. This arrangement allows for efficient and precise cutting of various materials using the set 120 collectively. In the example of FIG. 1, the set 120 includes three blades: a first blade 122, a second blade 124, and a third blade 126. However, the number of blades in the set 120 can vary. For example, the knife 100 may include 2, 3, 4, 5, 6, 7, 8, 9, or more blades, depending on the configuration.

One or more of the blades 122, 124, 126 may be fixed in position. For example, one or more of the blades 122, 124, 126 may be a full tang blade, which extends the full length of the handle, while other blades may be partial-tang blades that extend only partially into the handle. In some cases, each of the of the blades 122, 124, 126 are partial tang. The specific configuration of the blades 122, 124, 126 can vary depending on the desired cutting performance or adjustability.

In some cases, some or all of the blades 122, 124, 126 may be movable with respect to each other. For instance, in some cases, the second blade 124 may be centered or substantially centered in the knife 100, while the first and third blades 122, 126 are positioned on each side of the second blade 124. In some such cases, the second blade 124 may be fixed in position relative to the handle 110, while the first and/or third blades 122, 126 may be movable with respect to the second blade 124. For example, the first blade 122 can be adjusted to different distances from the second blade 124 to accommodate different cutting requirements, which can be achieved by manipulating the blade spacing adjustment mechanism 130. For instance, the first blade 122 can be moved closer to the second blade 124 to provide a narrower cutting width or further away to provide a wider cutting width. In some such cases, the first and/or third blades 122, 126 may be movable independently or together with respect to the second blade 124.

The blades 122, 124, 126 are supported by the handle 110, which can be designed to support the blades 122, 124, 126 in a parallel orientation with the cutting edge of each blade linearly aligned with one or more other blades. Each blade 122, 124, 126 may include a tip end 123 and a second end 125 that is opposite the tip end 123. In some embodiments, the second end 125 may be coupled to or integrated with a support member 128 that is adjustable in position relative to the handle 110 and/or the second blade 124. The support member 128 may be coupled to an end of the blade 122 or 126, and may be in mechanical communication with the blade spacing adjustment mechanism 130. The position of the support member 128 can be adjusted using the blade spacing adjustment mechanism 130.

The blade spacing adjustment mechanism 130 can be used to adjust the position of the blades 122, 124, 126 relative to each other and/or the handle 110. For instance, the first blade 122 can be moved closer to the second blade 124 to provide a narrower cutting width, or further away to provide a wider cutting width. The first and third blades 122, 126 may move together or independently, depending on the particular design of the blade spacing adjustment mechanism 130.

The blade spacing adjustment mechanism 130 allows for convenient and precise adjustment of the blade spacing to accommodate various cutting requirements. In some embodiments, the blade spacing adjustment mechanism 130 may include one or more thumb screws 132, which can be easily manipulated to achieve the desired blade spacing. In some such cases, by rotating the thumb screw 132 about a rotation axis (e.g., rotation axis 406 of FIG. 4), the support members 128 and/or one or more of the blades 122, 124, 126 can be made to travel along the rotation axis, thereby translating the blade along the rotation axis relative to the other blades.

As an example, the blade spacing adjustment mechanism 130 may enable independent movement of the first blade 122 and the third blade 126. In some cases, rotation in a first direction (e.g., clockwise) can cause the first blade 122 to move closer to the second blade 124, while rotation in a second direction (e.g., counterclockwise) can cause the first blade 122 to move further away from the second blade 124. Similarly, the third blade 126 can be moved independently of the first blade 122 and the second blade 124, using a separate thumb screw. For instance, the blade spacing adjustment mechanism 130 can include multiple thumb screws 132, with each thumb screw controlling the movement of a particular blade. As such, each blade can be adjusted to a desired position, allowing for precise customization of the cutting width and blade spacing. This provides the operator with the flexibility to adjust the spacing between the blades 122, 124, 126 as needed, depending on the type of material being cut and the desired cutting width. Alternatively, in some cases, the movement of the first blade 122 and the third blade 126 can be linked, such that rotation of a single thumb screw 132 causes both blades 122, 126 to move together, either closer to or further away from the second blade 124.

In certain embodiments, the knife 100 can include a locking mechanism or feature (not shown) that restricts or prevents movement of at least one of the blades 122, 124, 126 relative to each. For example, in some cases, the blade spacing adjustment mechanism 130 can include a worm drive gear arrangement. The worm gears can have a unidirectional nature that prevents or inhibits reverse rotation, allowing them to maintain their position and resist external forces acting on them. Consequently, the blades 122, 124, 126 can be conveniently adjusted by manipulating the blade spacing adjustment mechanism 130, while remaining resistant to manual movement, such as manually pushing the blades together or apart. Additionally, in some embodiments, the locking mechanism or feature can ensure that the blades 122, 124, 126 remain fixed in their desired positions during use, preventing unwanted shifting or movement of the blades. This provides a more stable and reliable cutting experience for the operator.

Although the blade spacing adjustment mechanism 130 is shown as including a thumb screw, it will be appreciated that the blade spacing adjustment mechanism 130 can include other mechanisms for adjusting a spacing between the blades. For example, a rack and pinion mechanism could be used where a rack is attached to the second and third blades and a pinion is attached to a thumb screw. Rotating the thumb screw would move the pinion along the rack and adjust the spacing between the blades. Alternatively, a cam mechanism could be employed where a cam is attached to the second and third blades and a thumb screw is used to rotate the cam, which moves the blades closer or further apart depending on the direction of rotation. The knife could also include a sliding mechanism, where the second and third blades are mounted on a track and a thumb screw is used to move the blades along the track, adjusting the spacing between the blades. Alternatively, a pneumatic or hydraulic mechanism could be used, where air or fluid pressure is used to adjust the spacing between the blades. A control valve could be used to regulate the pressure and adjust the spacing as needed.

The knife 100 can be designed in various embodiments to provide a broad range of blade spacing options, allowing an operator to adjust the spacing between blades according to their needs. The knife can also be user-friendly, with the blade spacing adjustment mechanism 130 being easy to access and adjust. For example, the blade spacing adjustment mechanism 130 can be located at the top or bottom of the knife 100, allowing an operator to easily adjust the blade spacing during use.

Figure 2:
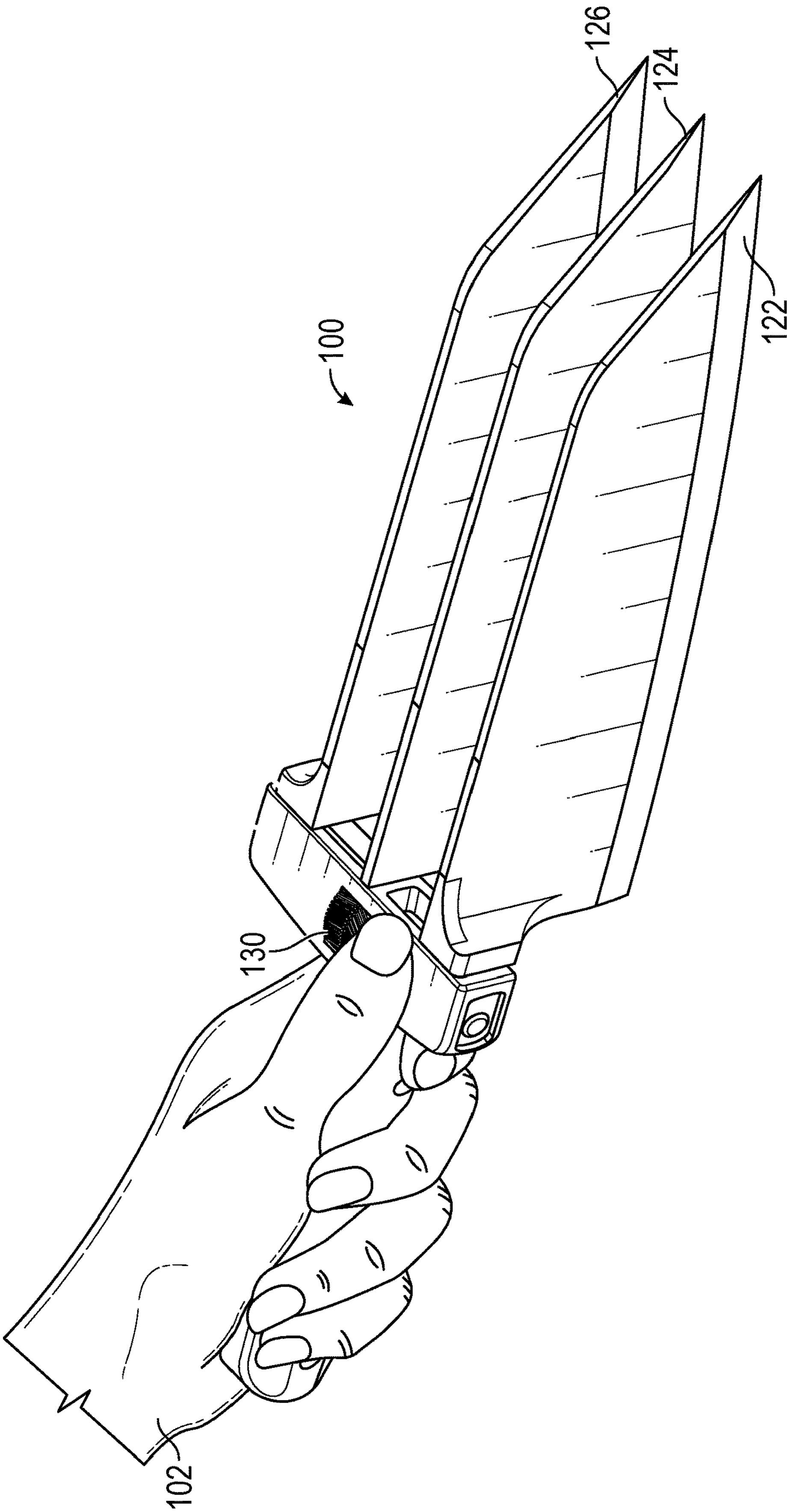
FIG. 2 depicts an environmental view of the multi-blade adjustable knife of FIG. 1 in use.

FIG. 2 depicts an environmental view of the multi-blade adjustable knife 100 of FIG. 1 in use. In this example, the knife 100 is being held by an operator 102 who is gripping the handle 110 to hold the knife 100. The operator 102 has positioned their thumb near the blade spacing adjustment mechanism 130, which is located at the top portion of the knife 100 in this example, but it may be located at other positions on the knife 100, as discussed before. Although the multi-blade adjustable knife is shown as a pair of thumb wheels, it should be understood that the mechanism can be implemented as a single mechanism, or multiple dependent or independent mechanisms depending on the specific application. Furthermore, in some cases where multiple blade spacing adjustment mechanisms are used, a gap may be present between the mechanisms. In some cases, the multiple mechanisms allow for independent adjustment of each blade. Alternatively, in some cases, the multiple mechanisms may be interlocked or fixed together, whereby rotating one of the mechanisms will cause the other mechanism to rotate as well.

In comparison to the configuration shown in FIG. 1, FIG. 2 illustrates the blades 122, 124, 126 further away from each other. For example, by manipulating the blade spacing adjustment mechanism 130, the operator 102 has adjusted the distance between the blades 122, 124, 126 to meet their specific cutting requirements. A locking mechanism or feature (not shown) can increase a likelihood that the blades 122, 124, 126 remain in the desired position during use, providing a stable and secure blade configuration.

FIG. 2 provides a visual representation of example features and ease of use, demonstrating the practical application of the multi-blade adjustable knife 100. The user-friendly design of the knife 100 allows for efficient and precise cutting of various materials, while providing a customizable and secure cutting configuration.

Figure 3:
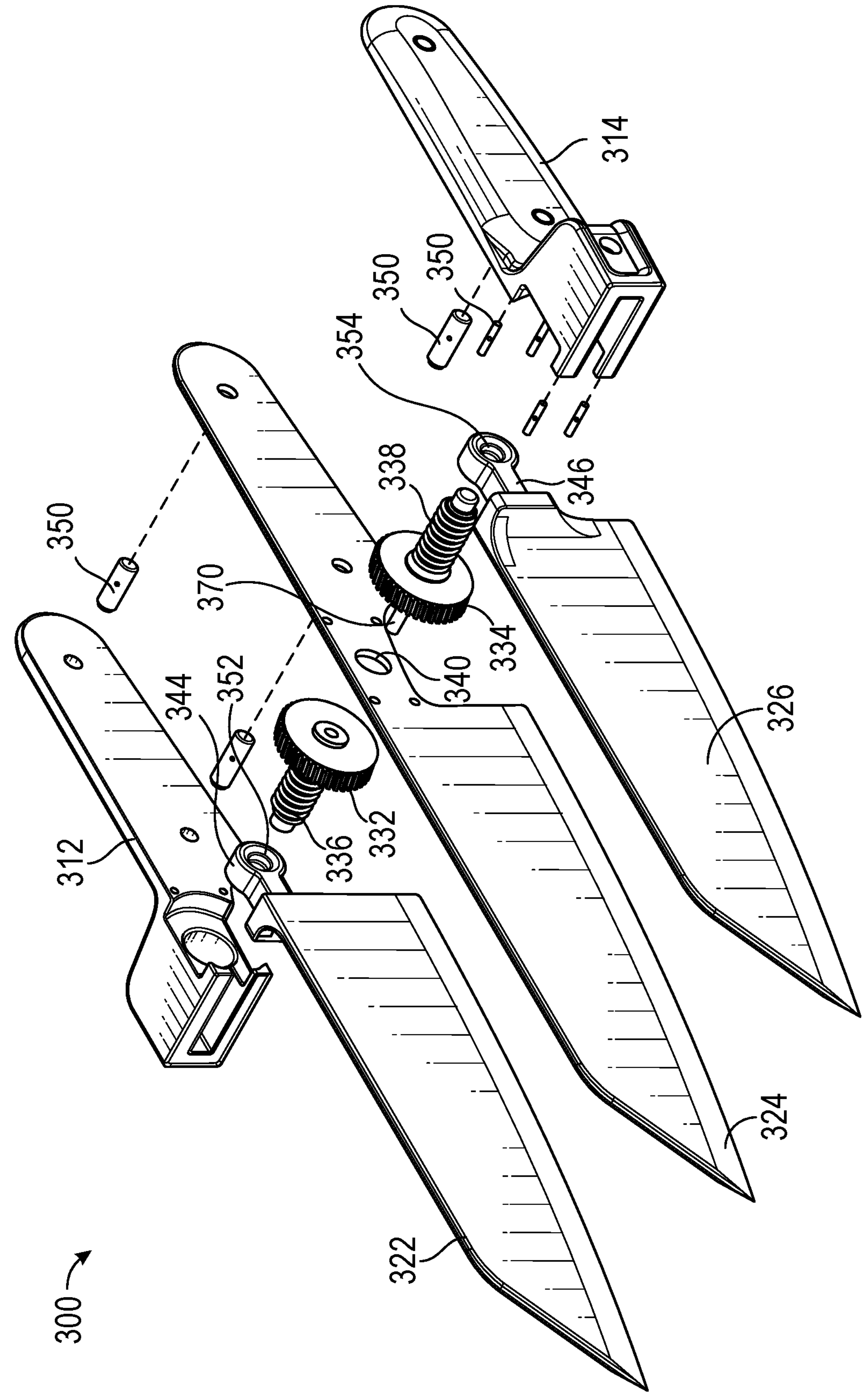
FIG. 3 illustrates an exploded view of an example multi-blade adjustable knife in accordance with various embodiments of the present disclosure.

FIG. 3 illustrates an exploded view of an example multi-blade adjustable knife 300, which is an embodiment of the knife 100 of FIG. 1. The knife 300 includes a first blade 322, a second blade 324, a third blade 326, a first handle housing 312, a second handle housing 314, attachment members 350, and a blade spacing adjustment assembly. In this example, the second blade 324 is a full tang blade that extends the length of the knife 300 through the handle (e.g., first handle housing 312 and second handle housing 314), while the first blade 322 and the third blade 326 are partial-tang blades (e.g., half tang), which extend only partially into the handle.

The blade spacing adjustment assembly includes two thumb screws 332, 334, each of which is coupled to a respective screw member 336, 338. The screw members 336, 338 are in the form of elongated screws that extend from the respective thumb screw 332, 334 to support members 344, 346 coupled to the ends of the first and third blades 322, 326. The support members 344, 346 include screw interfaces 352, 354 that interface with the screw members 336, 338. The screw members 336, 338 are rotatable by manipulating the thumb screws 332, 334, causing them to screw into or unscrew from the screw interfaces 352, 354 of the support members 344, 346. The support members 344, 346 and screw members 336, 338 can form a screw-and-nut mechanism, which enables precise and controlled adjustment of the distance between the blades. When the screw members 336, 338 are unscrewed, the first and third blades 322, 326 move away from the second blade 324, thereby increasing the distance between the blades 322, 324, 326. When the screw members 336, 338 are screwed into the screw interfaces 352, 354, the first and third blades 322, 326 move towards the second blade 324, thereby decreasing the distance between the blades 322, 324, 326.

The blade spacing adjustment assembly includes an attachment member 370 that couples the thumb screws 332, 334 and extends through an aperture 340 in the second blade 324. In this way, the blade spacing adjustment assembly may be supported, at least partially, by the aperture 340 in the second blade 324. Further, the screw member 336, 338 extend from their respective thumb screws 332, 334 to the screw interfaces 352, 354 of the support members 344, 346. In this way, the blade spacing adjustment assembly may be supported, at least partially, by the screw interfaces 352, 354 of the support members 344.

Figure 4:
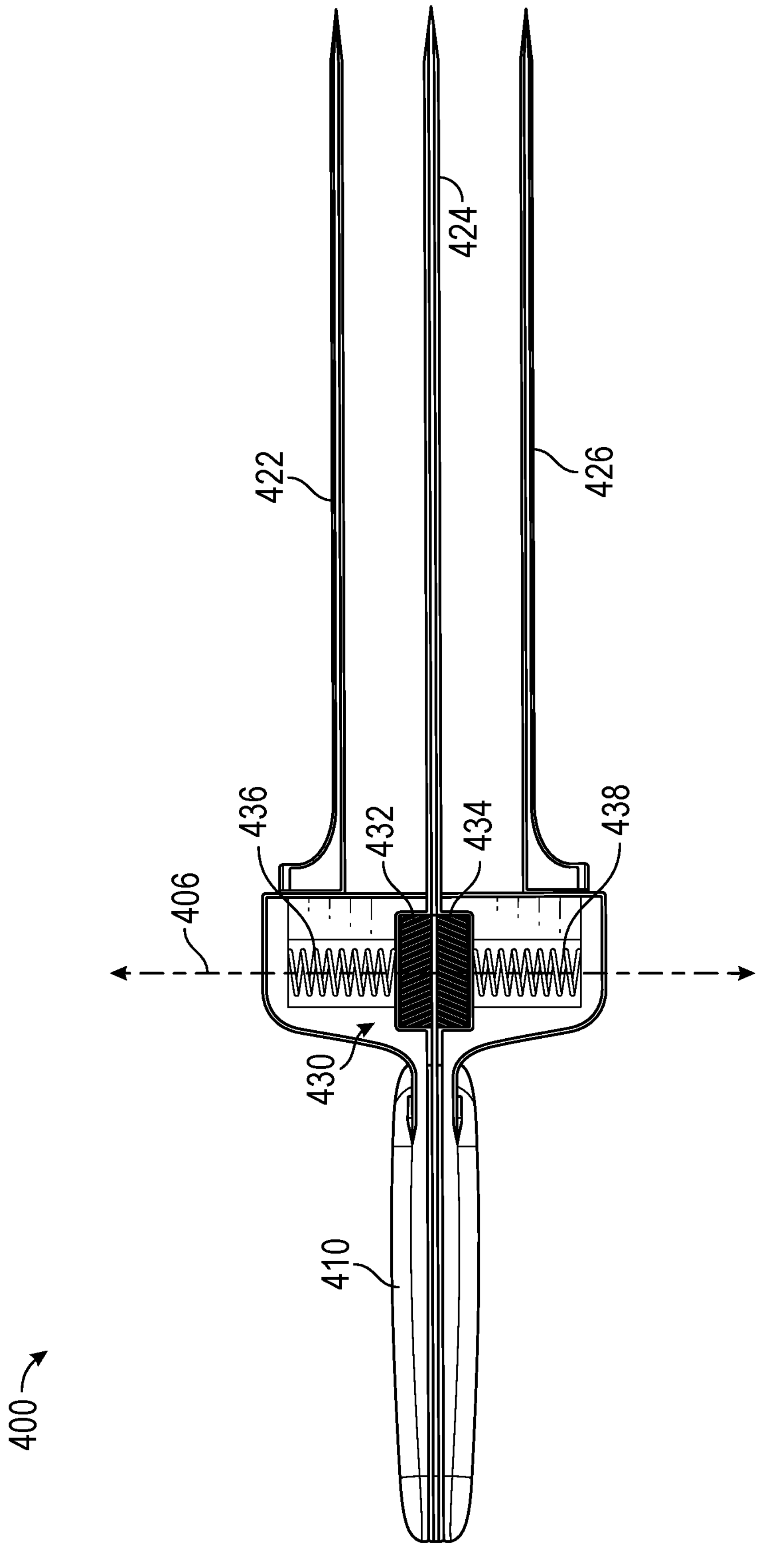
FIG. 4 illustrates a bottom view of an example multi-blade adjustable knife, with some of the housing components shown transparently so as to allow visualization of some of the internal components of the knife.

FIG. 4 illustrates a bottom view of an example multi-blade adjustable knife 400, with some of the housing components shown transparently so as to allow visualization of some of the internal components of the knife 100. The knife 400 includes a first blade 422, a second blade 424, a third blade 426, a handle 410, and a blade spacing adjustment mechanism 430. In this example, the second blade 424 is a full tang blade that extends the length of the knife 400 through the handle 410, while the first blade 422 and the third blade 426 are partial-tang blades, which extend only partially into the handle 410. The knife 400 may be an embodiment of the knife 100 of FIG. 1.

In this example, the blade spacing adjustment mechanism 430 is implemented using two thumb screws 432, 434, which are positioned on either side of the second blade 424 to facilitate centering of the thumb screws 432, 434 in the knife 400. However, it should be appreciated that the number of thumb screws in the blade spacing adjustment mechanism 430 can vary. For example, in some cases, the knife 400 may include a single thumb screw or more than two thumb screws. The positioning of the thumb screws 432, 434 may also vary depending on the configuration of the blades 422, 424, and 426. For instance, in some embodiments, the thumb screw or screws may be off-centered or positioned at different locations to suit the blade configuration. Furthermore, it should be appreciated that, in some cases, the full tang blade may not be centered, or, in some cases, the knife 400 may not include any full tang blades. The configuration and positioning of the thumb screws 432, 434 may vary accordingly, depending on the number and configuration of the blades. When the thumb screws 432, 434 are rotated about rotation axis 406, the screw members 436, 438 can screw into or unscrew from the screw interfaces (not shown), causing the first and third blades 422, 426 to move closer to or further away from each other.

Figure 5A:
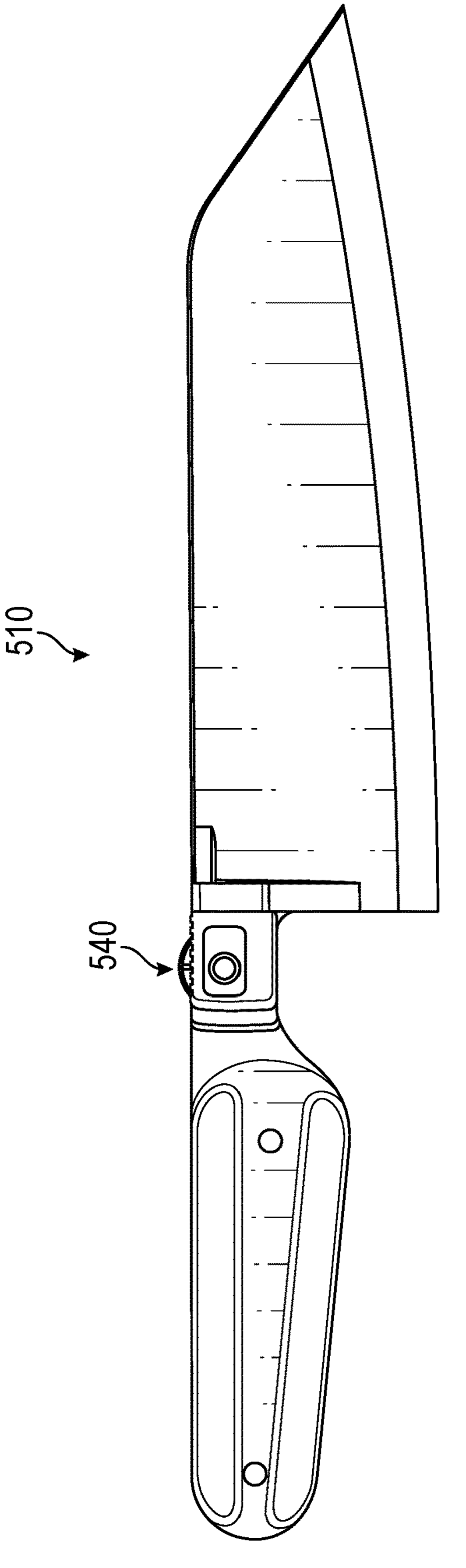
FIGS. 5A-5C illustrate side views of example multi-blade adjustable knives accordance with various embodiments of the present disclosure.
Figure 5B:
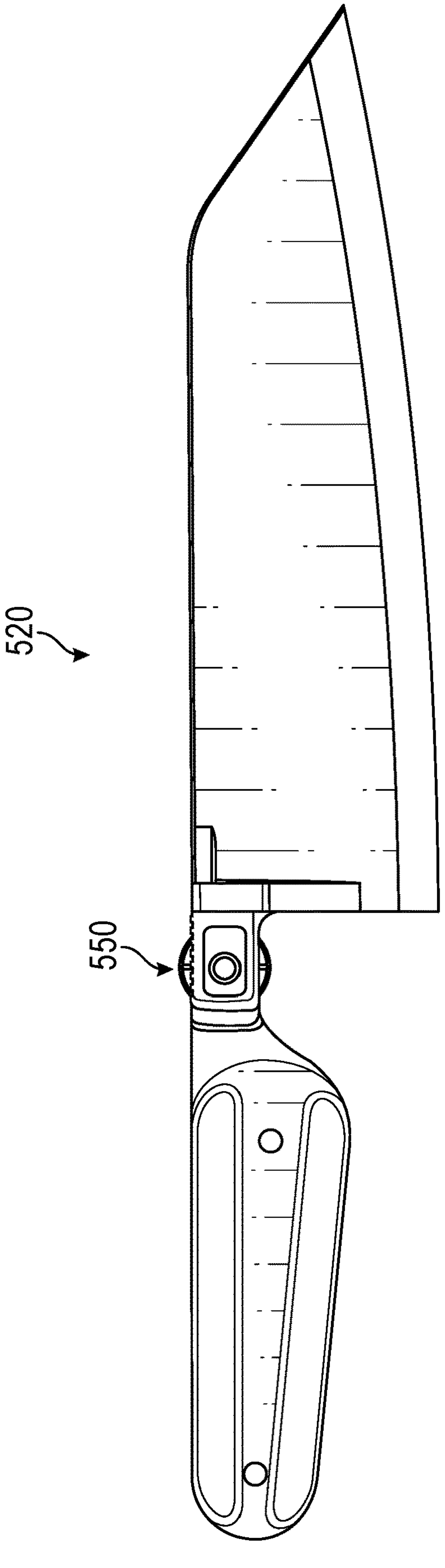
Figure 5C:
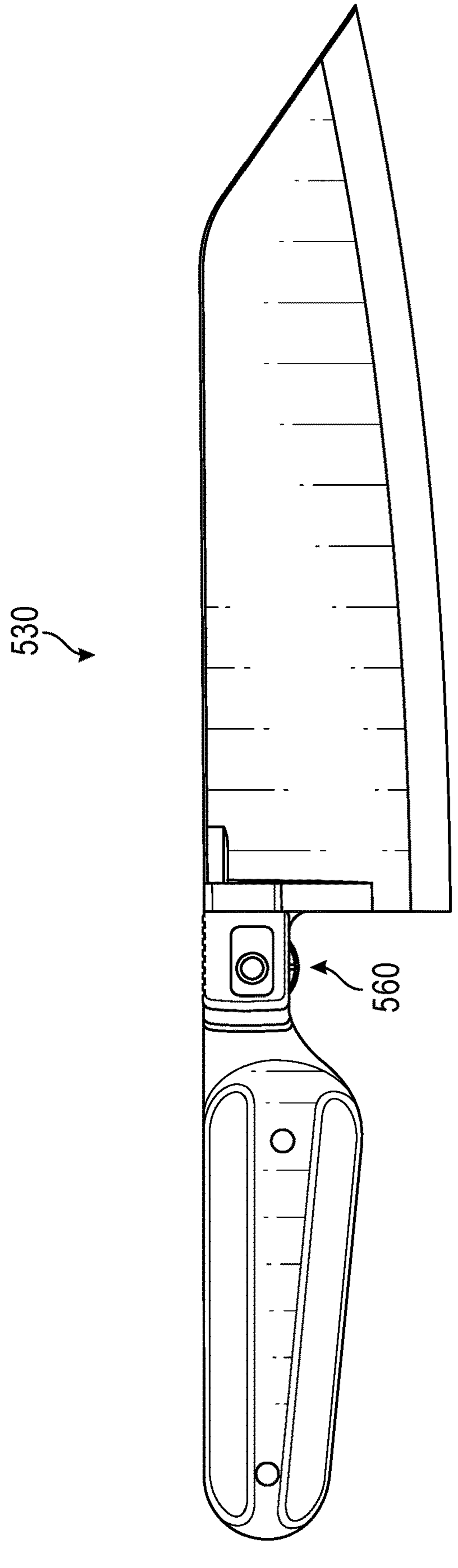

FIGS. 5A-5C illustrate side views of example multi-blade adjustable knives 510, 520, 530. Each knife 510, 520, 530 includes a blade spacing adjustment mechanism 540, 550, 560, respectively, which is positioned differently on each knife.

In FIG. 5A, the blade spacing adjustment mechanism 540 is accessible from the top of the knife 510 and is not accessible from the bottom of the knife. This positioning may advantageously reduce the risk of debris, such as food particles, getting trapped in or inhibiting the mechanism 540.

In FIG. 5B, the blade spacing adjustment mechanism 550 is accessible from both the top and bottom of the knife 520. This positioning can allow for greater flexibility in adjusting the blade spacing, as the operator can use their thumb to adjust the top mechanism or their pointer finger or other hand to adjust the bottom mechanism, depending on how the knife 520 is held. This can make it more comfortable and convenient for the operator to adjust the blade spacing to suit their needs.

In FIG. 5C, the blade spacing adjustment mechanism 560 is accessible only from the bottom of the knife 530. The different positions of the blade spacing adjustment mechanisms in these example knives provide various advantages and conveniences to the user, such as reducing the risk of debris getting trapped in the mechanism, or offering user-friendly access to the mechanism from both the top and bottom of the knife.

Terminology

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that the methods/steps described herein may be performed in any sequence and/or in any combination, and the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 10 degrees, 5 degrees, 3 degrees, or 1 degree. As another example, in certain embodiments, the terms "generally perpendicular" and "substantially perpendicular" refer to a value, amount, or characteristic that departs from exactly perpendicular by less than or equal to 10 degrees, 5 degrees, 3 degrees, or 1 degree.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. An adjustable multi-blade knife comprising:

a handle;

a plurality of blades oriented in parallel with each other and supported by the handle, wherein each blade of the plurality of blades has a cutting edge that is linearly aligned with each other cutting edge; and a blade spacing adjustment mechanism, wherein activation of the blade spacing adjustment mechanism causes movement of at least one blade of the plurality of blades relative to another blade of the plurality of blades while retaining a substantially parallel orientation between the plurality of blades.

2. The adjustable multi-blade knife of claim 1, wherein the blade spacing adjustment mechanism comprises a push button that, upon being pressed, causes movement of the at least one blade of the plurality of blades.

3. The knife of claim 1, wherein the blade spacing adjustment mechanism includes a thumb wheel, wherein rotation of the thumb wheel activates the blade spacing adjustment mechanism.

4. The knife of claim 3, wherein the plurality of blades includes a first blade and a second blade, wherein the rotation of the blade spacing adjustment mechanism causes the second blade to move further away from the first blade or move closer to the first blade, while retaining the substantially parallel orientation with the first blade.

5. The knife of claim 4, wherein the plurality of blades further comprises a third blade, wherein the rotation of the blade spacing adjustment mechanism causes the second blade and the third blade to move in opposite directions.

6. The knife of claim 1, wherein the plurality of blades includes a first blade and a second blade, wherein the blade spacing adjustment mechanism is in mechanical communication with a support member coupled to at least one blade of the plurality of blades, wherein the activation of the blade spacing adjustment mechanism causes the support member to translate the support member in a first direction, thereby translating the second blade in the first direction.

7. The knife of claim 6, wherein the first blade is a full tang blade that extends a full length of the handle.

8. The knife of claim 7, wherein the second blade is a partial tang blade.

9. The knife of claim 6, wherein the blade spacing adjustment mechanism comprises a thumb screw and an elongate screw member extending from the thumb screw, wherein the support member comprises a screw interface for interfacing with the elongate screw member.

10. The knife of claim 9, wherein the screw interface of the support member and the elongate screw member of the blade spacing adjustment mechanism form a screw-and-nut mechanism, and wherein rotation of the thumb screw causes the elongate screw member to screw into or unscrew from the screw interface, wherein unscrewing the elongate screw member from the screw interface increases a distance between the first blade and the second blade, and wherein screwing the elongate screw member into the screw interface decreases the distance between the first blade and the second blade.

11. The knife of claim 1, wherein the blade spacing adjustment mechanism is supported by an aperture in one of the plurality of blades.

12. The knife of claim 1, wherein the blade spacing adjustment mechanism is accessible by an operator from a top portion of the knife, and wherein the blade spacing adjustment mechanism is not accessible from any other portions of the knife.

13. The knife of claim 1, further comprising a locking feature, wherein the locking features inhibits shifting or movement of the plurality of blades during use of the knife, while allowing manipulation of the plurality of blades via the blade spacing adjustment mechanism.

14. A multi-blade adjustable knife, comprising:

a handle;

a first blade extending a length of the handle;

a second blade and a third blade positioned on opposite sides of and oriented in parallel with the first blade, wherein each of the second and third blades comprises a tip end and a second end that is opposite a respective tip end, and wherein each of the first, second, and third blades has a respective cutting edge that is linearly aligned with each other cutting edge;

respective support members coupled to the second ends of the second and third blades, each support member having a screw interface;

a blade spacing adjustment mechanism comprising:

thumb screws positioned on opposite sides of the first blade;

screw members extending from the thumb screws to the screw interfaces in the respective support members, wherein the screw members are rotatable by manipulating the thumb screws to screw into or unscrew from the screw interfaces; and an attachment member that couples the thumb screws and extends through an aperture in the second blade, wherein rotation of the thumb screws in a first direction causes the screw members to at least partially unscrew from the screw interfaces and the first and third blades to move away from the second blade while retaining a substantially parallel orientation with the first blade, and wherein rotation of the thumb screws in a second direction causes the screw members to at least partially screw into the screw interfaces and the first and third blades to move towards the second blade while retaining the substantially parallel orientation with the first blade.

15. The knife of claim 14, wherein each thumb screw is configured to rotate independently of all other thumb screws, thereby allowing independent adjustment of a position of the second blade or the third blade.

16. The knife of claim 14, wherein the first blade is a full tang blade and the second and third blades are not full tang blades.

17. The knife of claim 14, wherein the blade spacing adjustment mechanism is accessible by an operator from a top portion of the knife, and wherein the blade spacing adjustment mechanism is not accessible from any other portions of the knife.

18. The knife of claim 14, further comprising a locking feature that inhibits shifting or movement of the first, second, and third blades during use of the knife.

19. A method of adjusting spacing between a first blade and a pair of second and third blades in a multi-blade adjustable knife, the method comprising:

providing a multi-blade adjustable knife comprising:

a handle, a first blade extending a length of the handle, a second blade and a third blade positioned on opposite sides of and oriented in parallel with the first blade, wherein each of the second and third blades comprises a tip end and a second end that is opposite a respective tip end, and wherein each of the first, second, and third blades has a respective cutting edge that is linearly aligned with each other cutting edge, respective support members coupled to the second ends of the second and third blades, each support member having a screw interface, and a blade spacing adjustment mechanism comprising thumb screws positioned on opposite sides of the first blade, elongated screw members extending from the thumb screws to the screw interfaces in the respective support members, and an attachment member that couples the thumb screws and extends through an aperture in the second blade; and rotating the thumb screws in a first direction to cause the screw members to at least partially unscrew from the screw interfaces, thereby moving the first and third blades away from the second blade while retaining a substantially parallel orientation with the first blade.

20. The method of claim 19, further comprising rotating the thumb screws in a second direction to cause the screw members to at least partially screw into the screw interfaces, thereby moving the first and third blades towards the second blade while retaining the substantially parallel orientation with the first blade.

* * * * *